Patented June 19, 1951

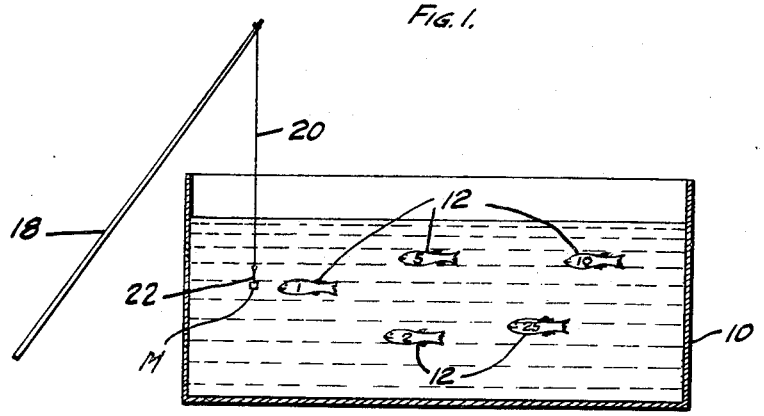
Fig. 1.
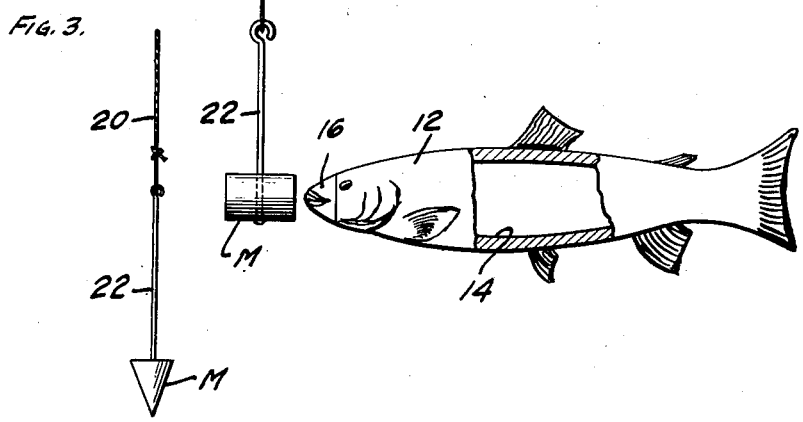
Fig. 2.
Fig. 3.
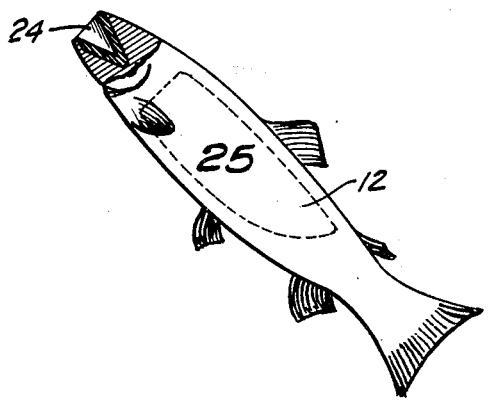
INVENTOR.
JOHN F. LAMKA
BY Harry H. Hitzeman
ATTORNEY.

2,557,789

UNITED STATES PATENT OFFICE 2,557,789

NOVELTY FISHING GAME

John F. Lamka, Chicago, Ill.

Application June 24, 1946, Serial No. 678,947

1 Claim. (Cl. 273—140)

My invention relates to a fishing game which is capable of providing amusement to young and old alike and which also combines skill and luck in providing a fascinating game.

Fishing games have been known for many years by those who attend county fairs and church picnics. These generally consist of providing a youngster with a pole having a cord and a hook which is then tossed over a wall and an attendant fastens a prize on the hook.

One of the objects of the present invention is to provide an improvement in a novelty fishing game of this type wherein no attendant is required. Imitation fish are placed in an actual pool of water and the fisherman throws his hook in the water and moves it about until he feels a "fish" on the line.

A further object of the invention is to provide a fishing game of the type described wherein magnetism is used as the attraction on the hook for drawing the fish to the same and adhering the fish to the hook sufficiently so that it can be withdrawn from the water.

A further object of the invention is to provide fish for this purpose, so constructed that they will be capable of floating at various submerged depths and on a horizontal keel.

A further object of the invention is to provide a novelty fishing game and equipment for the same, which is so simple to operate that normal infants can amuse themselves with the same by fishing in the bathtub or in a pan of water in which the fish have been placed.

Other objects and advantages will be more apparent from the following description wherein reference is had to the accompanying sheet of drawings upon which:

Fig. 1 is a generally schematic drawing showing a tank and fishing pole;

Fig. 2 is an enlarged view of one of the fish and the hook which I provide;

Fig. 3 is an enlarged view of a further modified type of fish and hook.

In the embodiment of the invention which I have chosen to illustrate, in Fig. 1 I have shown a tank 10 which may be partially filled with water and within which a plurality of fish 12 have been placed. Each one of the fish may be provided with different value indicia as, for example, the fish have the numbers 1, 10 and 25 imprinted on their sides.

Each of the fish (see Fig. 2) may be formed with a hollow portion 14 adjacent the forward end of the same and a metal portion 16 shaped to appear as a portion of the mouth of the fish. The metal is preferably soft iron or other metal which is easily attracted by a magnet. The purpose of forming the fish partially hollow is to balance the weight between the two ends, so that it will normally float in a horizontal position. The fish are preferably of such weight that they will partially sink in the water in the tank, so that they will be six, eight or ten inches below the surface.

In order to catch fish of the type which I have described, I provide a pole 18 which has a string 20 secured to the one end of the same. The string 20 may be provided with a hook 22 which comprises a stem portion connected to a permanent magnet M secured to the lower end of the same.

With the fishing equipment which I have just described, when the hook is dropped into the pool of water and moved about, when it gets within the vicinity of the metal portion of the fish, the fish will be attracted to the same and the fish can be pulled out of the pool with the magnetic hook. Upon examining the fish the person fishing will discover whether he has won a 1¢, 10¢ or 25¢ prize and will be rewarded accordingly. It is also obvious that for the amusement of small children their mothers can purchase the fish and fishing equipment provided, place the fish in a bathtub, dish or pan of water and a youngster can be amused by catching fish.

In Fig. 3, I have shown a modified form of hook and mouth of the fish. In this construction the magnet M may be generally conically shaped and the magnetically susceptible insert 24 in the mouth of the fish may be formed with a generally tapered opening, so that as the fish is attracted to the magnet the magnet will seat itself in the tapered hole in the member 24 and it will appear as though the fish had actually swallowed the hook.

Various changes and modifications may be made in the exact details shown and I do not wish to limit myself in any particular; rather what I desire to secure and protect by Letters Patent of the United States is:

A fishing game of the type described comprising an imitation fish that will float in water, an insert of magnetically susceptible material having a tapered opening mounted in the head of the fish, and a fishing pole having a line and a hook member at the end of said line, said hook member having a conically shaped head of a size adapted to fit into the tapered opening in said insert in the mouth of said fish, said hook member being made of magnetic material.

JOHN F. LAMKA.

REFERENCES CITED

The following references are of record in the file of this patent:

UNITED STATES PATENTS

| Number | Name | Date |
|---|---|---|
| 420,149 | Elson | Jan. 28, 1890 |
| 2,107,672 | Lang | Feb. 8, 1938 |
| 2,408,141 | Heil | Sept. 24, 1946 |